(12) United States Patent
Rothschild et al.

(10) Patent No.: US 8,516,603 B2
(45) Date of Patent: Aug. 20, 2013

(54) SYSTEMS AND METHODS PROVIDING A SEPARABLE DIGITAL RIGHTS MANAGEMENT APPLICATION

(75) Inventors: Keith Alan Rothschild, Dunwoody, GA (US); Julius Bert Bagley, Lawrenceville, GA (US)

(73) Assignee: Cox Communications, Inc., Atlanta, GA (US)

( * ) Notice: Subject to any disclaimer, the term of this patent is extended or adjusted under 35 U.S.C. 154(b) by 436 days.

(21) Appl. No.: 12/840,616

(22) Filed: Jul. 21, 2010

(65) Prior Publication Data
US 2012/0023590 A1 Jan. 26, 2012

(51) Int. Cl.
*G06F 7/04* (2006.01)
*G06F 17/30* (2006.01)
*H04N 7/16* (2011.01)

(52) U.S. Cl.
USPC ............................................. 726/27; 380/200

(58) Field of Classification Search
USPC ............................... 726/27; 725/87; 713/182
See application file for complete search history.

(56) References Cited

U.S. PATENT DOCUMENTS

| 7,383,438 | B2 * | 6/2008 | Fahrny et al. ................. | 713/169 |
|---|---|---|---|---|
| 7,965,839 | B2 * | 6/2011 | Candelore ...................... | 380/200 |
| 2003/0126086 | A1 | 7/2003 | Safadi | |
| 2005/0169473 | A1 * | 8/2005 | Candelore ...................... | 380/239 |
| 2006/0198519 | A9 | 9/2006 | Candelore | |
| 2008/0098212 | A1 | 4/2008 | Helms et al. | |
| 2008/0123846 | A1 | 5/2008 | Candelore | |
| 2009/0007240 | A1 | 1/2009 | Vantalon et al. | |
| 2009/0037964 | A1 | 2/2009 | Murray et al. | |
| 2009/0199287 | A1 | 8/2009 | Vantalon et al. | |
| 2010/0058485 | A1 * | 3/2010 | Gonzalez ........................ | 726/27 |
| 2010/0153711 | A1 * | 6/2010 | Koo et al. ...................... | 713/156 |
| 2010/0313014 | A1 * | 12/2010 | Medvinsky et al. .......... | 713/158 |

\* cited by examiner

*Primary Examiner* — Mohammad W Reza
*Assistant Examiner* — Monjour Rahim
(74) *Attorney, Agent, or Firm* — Sutherland Asbill & Brennan LLP

(57) ABSTRACT

Systems and methods providing content having digital rights management (DRM) applications separable from other authorization applications are provided. A system may include a distribution service provider system in communication with a content provider system and consumer premise equipment (CPE) for the transmission of content from the content provider system to the CPE device. The distribution service provider system may: receive A/V content provided by the content provider system, wherein the A/V content includes a DRM application; apply a conditional access system (CAS) application to the A/V content that is independent of the DRM application; and transmit the A/V content including the CAS and the DRM applications to the CPE for presentation. The CPE device can perform DRM authorizations with the content provider or a third-party DRM provider.

35 Claims, 8 Drawing Sheets

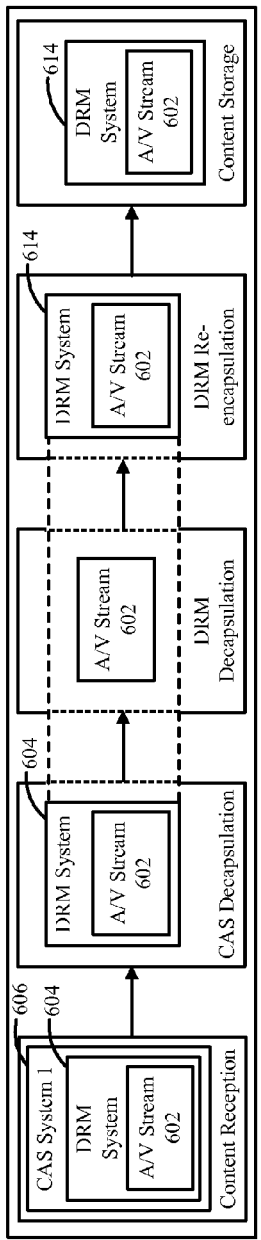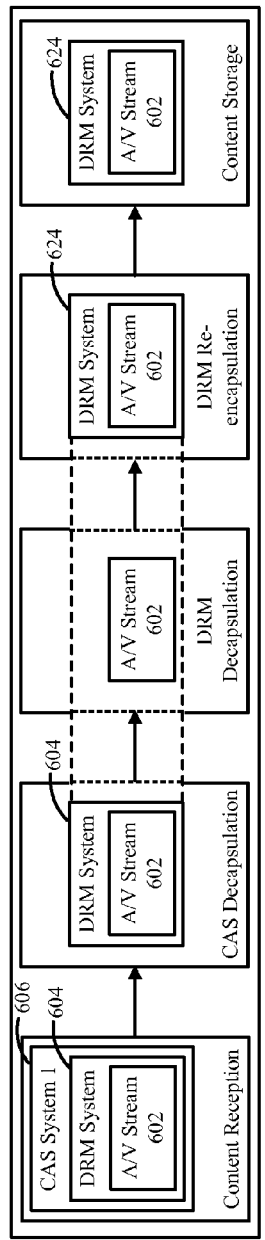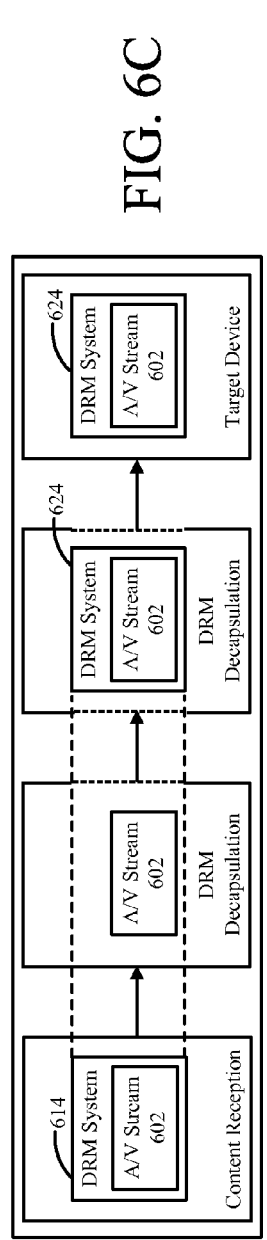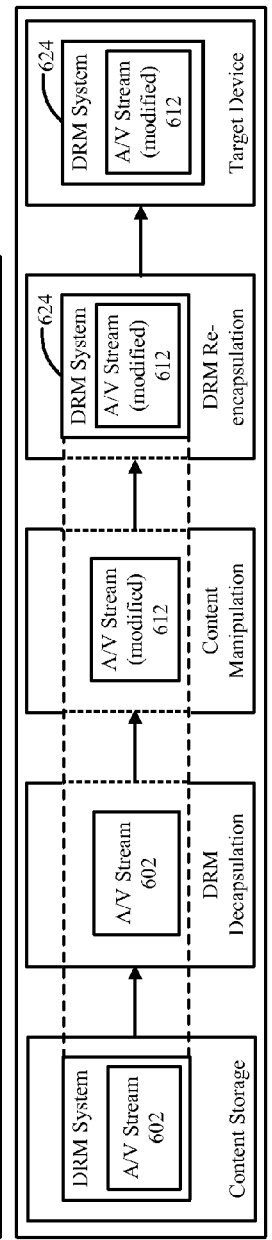
FIG. 6A
FIG. 6B
FIG. 6C
FIG. 6D

SYSTEMS AND METHODS PROVIDING A SEPARABLE DIGITAL RIGHTS MANAGEMENT APPLICATION

FIELD OF THE INVENTION

Aspects of the invention relate generally to media networks, and more particularly, to systems and methods providing a separable digital rights management application.

BACKGROUND OF THE INVENTION

Digital rights management (DRM) solutions often present problems between content providers and service providers, such as content distribution networks or other media or content distribution systems. Content providers that generate and/or provide content (e.g., audio-visual content, text-based content, non-text-based content, graphic content, software applications, etc.) to distribution network operators desire to protect the content and limit the use and/or distribution of the content to authorized use and/or distribution. Otherwise, unauthorized use of content can lead to unauthorized (and often unlawful) bypassing of the content providers to obtain the same content (e.g., pirated versions, unauthorized copying, using, or sharing), which in turn results in reduced revenue to the content providers because of the decreased demand for content through authorized channels. Similarly, service providers that distribute content or otherwise facilitate the distribution of content to consumers also share similar concerns and a desire to avoid responsibility for downstream unauthorized uses. As a result, content providers and service providers struggle with providing a superior DRM solution to distributed content, which has yet to be identified. Many proposed DRM solutions overly complicate content preparation, distribution, and/or authorization processes, and unduly distract service providers from their core business of content distribution.

Accordingly, there exists a need for systems and methods that improve the provision of DRM applications by providing separable DRM.

BRIEF DESCRIPTION OF THE INVENTION

Some or all of the above needs and/or problems may be addressed by certain embodiments of the invention. According to one embodiment, a system for providing content having digital rights management applications separable from other authorization applications is provided. The system may include a distribution service provider system including at least one processor and memory storing computer-executable instructions, wherein the distribution service provider system is in communication with a content provider system and consumer premise equipment (CPE) for the transmission of content from the content provider system to the CPE. The distribution service provider system may be configured to: receive audio and/or video content (A/V content) provided by the content provider system, wherein the A/V content includes a digital rights management (DRM) application; apply a conditional access system (CAS) application to the A/V content, wherein the CAS application is independent of the DRM application; transmit the A/V content including the CAS application and the independent DRM application to the CPE for presentation; and perform CAS authorization with the CPE to authorize the A/V content according to the CAS application independent of the DRM application, wherein additional DRM authentication is to be performed by the CPE according to the DRM application.

According to another embodiment, a method for providing content having digital rights management applications separable from other authorization applications is provided. The method may include: receiving audio and/or video content (A/V content) from a content provider system, wherein the A/V content includes a digital rights management (DRM) application; applying a conditional access system (CAS) application to the A/V content, wherein the CAS application is independent of the DRM application; transmitting the A/V content including the CAS application and the independent DRM application to a customer premise equipment (CPE) for presentation; performing CAS authorization with the CPE to authorize the A/V content according to the CAS application independent of the DRM application, wherein additional DRM authentication is to be performed by the CPE according to the DRM application.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein:

FIGS. 6A-6D are block diagrams illustrating operations performed on content, according to example embodiments.

DETAILED DESCRIPTION

Figure 1:
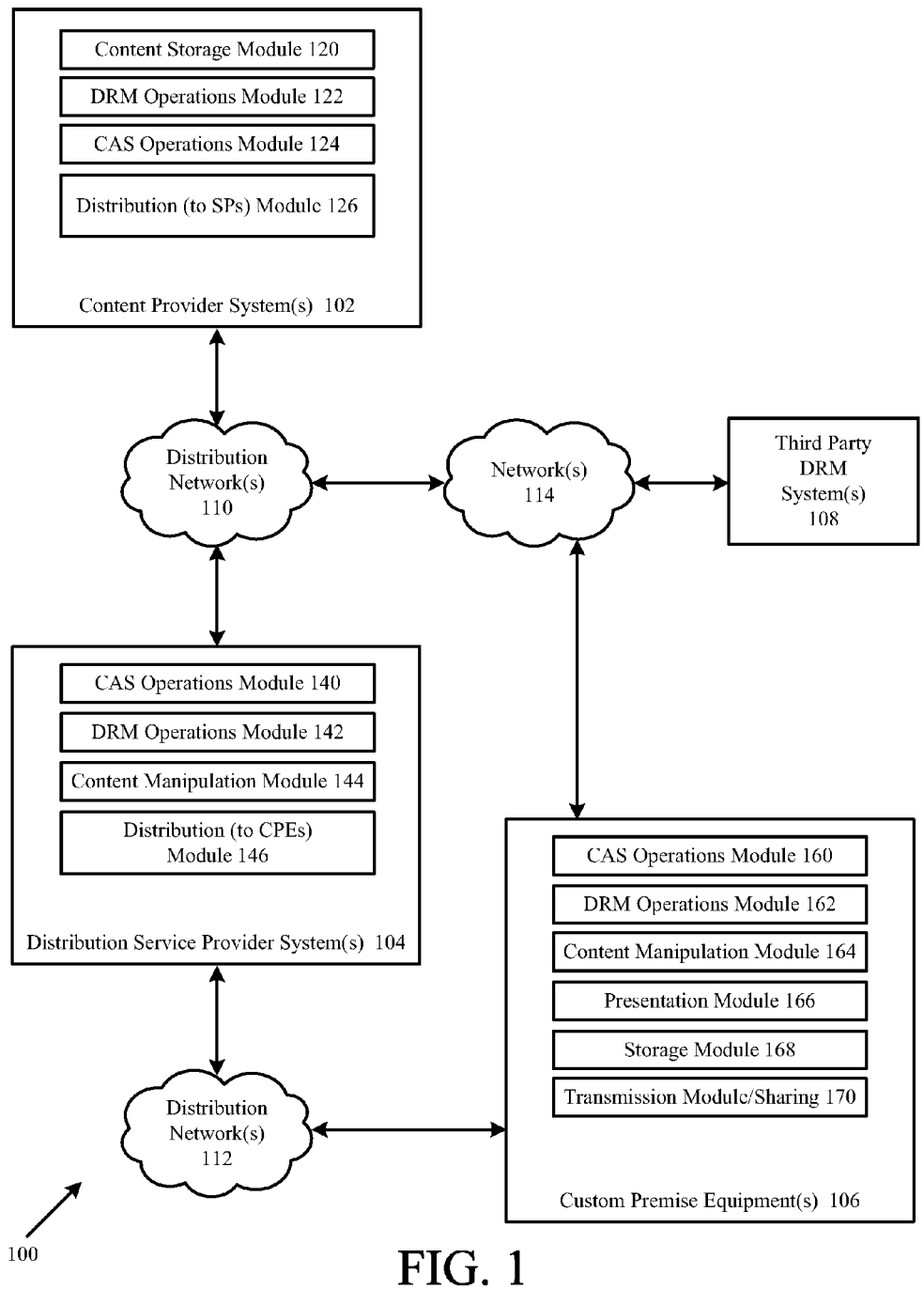
FIG. 1 is a block diagram illustrating a content distribution system capable of providing separable DRM, according to an example embodiment.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments described herein include systems and methods providing separable digital rights management. According to one embodiment, a content distribution service provider (also referred to herein interchangeably as a "distribution service provider" or a "service provider") receives audio and/or visual content (A/V content) from a content provider for delivery to one or more subscribers. Upon receipt of the A/V content, the distribution service provider may wish to process or manipulate the A/V content, such as for adding commercials to a video stream, adjusting resolution, etc. However, the A/V content may be protected by a DRM application provided or otherwise associated with the A/V content by the content provider to protect the content and prevent unauthorized use. In some instances, the A/V content may further include or otherwise have a conditional access system (CAS) application that also sets forth limits to the use of the A/V content, which is, however, independent of and separate from the DRM application. In some embodiments, both the CAS application and the DRM application are provided with the A/V content prior to receipt by the distribution service provider. Accordingly, upon receiving A/V content, a distribution service provider can remove the CAS application and remove the DRM application to allow processing the A/V content as desired. After performing the desired processing, the distribution service provider can re-apply the DRM application (which may be the same or a different DRM application) and apply a CAS application to the A/V content prior to distribution over a distribution network to end subscribers. The CAS application is separate from the DRM application, and typically will be a different CAS application than that provided by the content provider or at least represent different rights, but not always.

In various embodiments, the DRM application is provided with the A/V content either by the content provider or by a third-party DRM system prior to delivery of the A/V content to the distribution service provider. Accordingly, the distribution service provider need not be responsible for or maintain DRM application programming, policies, rights, verification, versions, or any other processing associated with implementing a full DRM solution with digital content. Instead, either the content provider or a third-party DRM system bears DRM processing responsibilities. As such, subscriber devices (also referred to herein interchangeably as "customer premise equipment" and/or "target devices") include programming and associated capabilities to handle DRM application processing and verification directly with either the content provider or a third-party DRM system, without having to perform DRM processing with the distribution service provider. This separated DRM solution allows the distribution service provider to focus on content distribution, and not DRM verification processing. Moreover, according to embodiments described herein, content providers and/or device manufacturers are left to determine the DRM solution desired for content and/or device usage, and are not limited to that implemented by a distribution service provider because the distribution service provider(s) do not provide the DRM solution, but instead distribute the A/V content with the DRM application as provided by the content provider or third-party DRM system.

However, to allow the distribution service provider to process the A/V content prior to distribution over the network, the DRM application associated with the A/V content as received from the content provider can first be removed or otherwise penetrated by the distribution service provider. Accordingly, the distribution service provider system includes a trusted domain, which provides secured processing and memory that protects A/V content against physical and logical attacks according to the DRM application. Otherwise, without a trusted domain, the A/V content may be exposed, allowing access or modification. The trusted domain allows removal of the DRM application from the A/V content while still protecting the A/V content from external access or modification. Within the trusted domain, the distribution service provider system can process or manipulate the A/V content, which may include adding commercials to a video stream, adjusting resolution, and the like. After processing the A/V content, the DRM application is re-added to the A/V content within the trusted domain. Accordingly, the A/V content retains its DRM application within the service provider everywhere but within the trusted domain, which sufficiently protects the A/V content from unauthorized access or use.

Similarly, if a CAS application is included with the A/V content from the content provider, the distribution service provider can be operable to remove the CAS application from the A/V content prior to removal of any DRM application (and after performing CAS authorization between the distribution service provider and the content provider). After re-applying the DRM application to the A/V content within the trusted domain, a different (or same) CAS application can be applied to or otherwise associated with the A/V content prior to distribution to subscribers. This second applied CAS application is used to determine whether the subscriber is authorized to receive the content from the distribution service provider, while the DRM application more comprehensively defines the general rights and limitations associated with use of the A/V content, which will be resolved with the content provider and/or a third-party DRM system.

Upon receipt of the A/V content that includes both a CAS application from the distribution service provider and a DRM application from the content provider or third-party DRM system at a subscriber's device, CAS authorization is performed with the distribution service provider. If CAS authorization is successful, use of the A/V content will be subject to the rights and limitations provided by the DRM application, which will be resolved with the content provider and/or a third-party DRM system, as set forth in the DRM application received with the A/V content. CAS or DRM authorization is not required to be performed online between the two respective systems, but may instead be performed utilizing certificates and/or cryptographic keys that may be exchanged or updated in real-time or offline and already stored on the viewer's device. Moreover, it is possible that, in some embodiments, the subscriber's device may also remove the DRM application from the A/V content as received, and apply a different DRM application, such as when sharing the A/V content with another target device that utilizes a different DRM solution, or when adjusting the resolution of the A/V content, which may require a lower resolution DRM application.

Accordingly, the solutions described herein allow a content provider to select the DRM solution that meets its business needs, and not be dependent upon or dictated by a distribution service provider. Thus, the content provider can alter or adjust the DRM solution applied to content based on DRM technology available at that time, and based upon the import of the content. For example, as newer and/or more valuable A/V content is being provided, a content provider, not being tied to a DRM solution dictated by a distribution service provider, can implement the newest or most appropriate DRM solution for the specific content being distributed.

As used herein, unless explicitly indicated otherwise, the term "A/V content" may refer to any content distributable over a content distribution network, such as, but not limited to: audio content, video content, graphic content, a video on-demand asset, any other on-demand asset, text-based content, non-text-based content, a software application, and the like.

As used herein, unless explicitly indicated otherwise, the term "distribution service provider" may refer to any service provider operable to distribute content over a content distribution network, which may include, but is not limited to: a cable provider, a multiple systems operator, a satellite provider, an IP content provider, or a digital media host (systems providing digital content over a network, such as digital music hosts, digital video hosts, e-book hosts, software providers, etc.), and the like.

As used herein, unless explicitly indicated otherwise, the term "CAS application" may refer generally to a system and/or associated programming logic that controls whether a system or device has access to distributed content, which may optionally include a temporal access limitation.

As used herein, unless explicitly indicated otherwise, the term "DRM application" may refer generally to a system and/or associated programming logic that prescribes the rights and limitations for the use of associated content, which is more comprehensive than a CAS application, and which implements corresponding controls, such as, but not limited to, prescribing rights based on time (duration), limiting the ability to copy, limiting the number of times content can be copied, limiting how often content can be copied, prescribing the format(s) and/or resolution(s) that are allowed, prescribing the interface(s) and/or hardware with which the content can be used, and the like.

More details regarding the various means for implementing the embodiments of the invention are provided below with reference to FIGS. 1-7C.

System Overview

An example system 100 will now be described illustratively with respect to FIGS. 1 and 2. The system 100 for providing separable DRM applications may include one or more content providers and associated content provider systems 102, one or more distribution service providers and associated distribution service provider systems 104, one or more customer premise equipment (CPE) devices 106, and optionally one or more third-party DRM systems 108. A content provider system 102 is in communication with a distribution service provider system 104 over a first distribution network 110, which allows transmitting the A/V content and performing CAS and/or DRM authorization therebetween. A service provider system 104 is in communication with one or more CPE devices 106 over a second distribution network 112, which allows the distribution to subscribers of A/V content that has a CAS application and a separate DRM application. In addition, one or more of the content provider systems 102, service provider systems 104, CPE devices 106, and third-party DRM systems 108 may be in communication with another network 114, such as the Internet, or any other wired and/or wireless public or private network.

Each of the aforementioned systems or system components can be embodied as a computer or a system of computers. FIG. 2 illustrates an example computer 200, which may be one or more processor-driven devices, such as, but not limited to, a server computer, a personal computer, and the like. In addition to having one or more processors 225, each computer 200 may also further include one or more memories 205, one or more input/output (I/O) interfaces 240, and one or more network interfaces 245. All of these components may be in communication over a data bus 230. The memory 205 may store data 215, various program logic 210 (such as the various programming modules described with reference to FIG. 1), and an operating system (OS) 220. In addition, in some embodiments, the memory 205 may further store a client and/or host module for accessing other computer devices and/or allowing access to the computer 200. The memory may further store a database management system (DBMS) for accessing one or more databases or other data storage devices. The data storage devices may be operative for storing content, associated content information, subscriber account information, programming information, CAS operation logic, DRM operation logic, and/or other information accessible by a computer 200. The I/O interface(s) 240 may facilitate communication between the processor 225 and various I/O devices, such as a keyboard, mouse, printer, microphone, speaker, monitor, and the like. The network interface(s) 245 may take any of a number of forms, such as, but not limited to, a network interface card, a modem, a wireless network card, and the like.

In one embodiment, such as when the computer 200 is included as part of a distribution service provider system 104, the network interfaces 245 may include network system hardware, software, and/or firmware operable to provide content and other data transmission over the first and/or the second distribution network 110, 112, such as over an in-band and an out-of-band channel with a CPE device 106 (e.g., a set-top box, media gateway, and/or television, etc.) or with a content provider system 102, or over the network 114, such as when communicating with a third-party DRM system 108 and/or with other systems over the Internet, for example.

In another embodiment, such as when the computer 200 is included as part of a CPE device 106, the network interfaces 245 may include network system hardware, software, and/or firmware operable to receive content and other data transmission over the second distribution network 112, such as over an in-band and an out-of-band channel from a distribution service provider system 104. In addition, the network interfaces 245 may include network hardware that enables communication over the network 114, such as the Internet, which may be utilized to communicate with content provider systems 102 and/or third-party DRM systems 108 for performing DRM authorization, or with other third-party systems, such as for receiving content not provided by the distribution service provider system 104, for example.

Accordingly, each computer 200 is configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

With reference to the content provider system 102, various programming modules may be included therewith or otherwise executable thereby. Examples of a content provider include, but are not limited to, cable networks, movie and/or television studios, digital music providers or retailers, software providers or retailers, and other digital content providers. Example programming modules include, but are not limited to, a content storage module 120, a DRM operations module 122, a CAS operations module 124, and a distribution module 126.

The content storage module 120 facilitates the storage and retrieval of A/V content within the content provider system 102. It is appreciated that, according to various embodiments, a content provider system may be dedicated to one or a few types of A/V content (e.g., only A/V content, only audio content, etc.), or may provide many or all types of A/V content. According to one embodiment, the DRM operations module 122 facilitates the addition of DRM applications to A/V content prior to transmission to distribution service provider systems 104, as well as optionally the subsequent DRM authorization processing between the subscribers' CPE devices 106 and/or the distribution service provider systems 104. In another embodiment, the DRM operations module 122 coordinates the addition of DRM applications to A/V content by one or more third-party DRM systems 108, such as by communicating therewith and receiving content having associated DRM applications over the network 114. In another example, a third-party DRM system 108 may have access to the content provider system 102 to enable the third-party DRM system 108 to add the DRM application to A/V content within the content provider system 102. The CAS operations module 124 operates in a manner similar to the DRM operations module 122, facilitating the addition of CAS applications to A/V content prior to distribution and performing subsequent CAS authorizations between the distribution service provider systems 104 and the respective content provider system 102. The distribution module 126 facilitates the distribution of A/V content, having DRM and optionally CAS applications added thereto, over the first distribution network 110 to one or more distribution service providers 104.

With reference to the distribution service provider system 104, various programming modules may be included therewith or otherwise executable thereby. As discussed above, a distribution service provider may refer to any service provider operable to distribute content over a content distribution network, which may include, but is not limited to: a cable provider, a multiple systems operator, a satellite provider, an IP content provider, or a digital media host (systems providing digital content over a network), and the like. Accordingly, a distribution service provider system may represent a multiple-system operator (MSO) system, or other content network operator system, and may logically include operations performed in part by the network plant, the headend, and/or any other component or device of a conventional network operator system. Example programming modules include, but are not limited to, a CAS operations module 140, a DRM operations module 142, a content manipulation module 144, and a distribution module 146.

The CAS operations module 140 performs CAS authorization between the distribution service provider system 104 and the respective content provider system 102 for A/V content received that includes a CAS application. CAS authorizations may be performed one-way or two-way between the two systems. In addition, the CAS operations module 140 facilitates the addition of CAS applications to A/V content prior to transmitting the A/V content to subscribers, such as after having removed and re-applied a DRM application. The DRM operations module 142 facilitates removal of DRM applications from A/V content upon receipt to allow subsequent processing of the content, as well as the subsequent re-application of the DRM application with the A/V content prior to distribution. In one embodiment, the operations provided by the DRM operations module 142 are performed within the trusted domain of the distribution service provider system 104, preventing outside or unauthorized access or use of A/V content while the DRM application is removed for processing the content. It is appreciated that, in one embodiment, the trusted domain of the distribution service provider system 104 entails a separate device or system component that is secure according to the rights and limitations conferred by the DRM application; however, in other embodiments, the trusted domain may be a secured segment of any other device or system component supporting additional functionality. The content manipulation module 144 is utilized to facilitate processing A/V content within the trusted domain of the distribution service provider system 104. Processing A/V content may include, but is not limited to, manipulation, removal, and/or adding to content streams (e.g., adding audio and/or video to content streams, such as inserting advertisements), altering content resolution, or rate or traffic shaping. The distribution module 146 facilitates the distribution of A/V content having DRM and CAS applications added thereto over the second distribution network 112 to one or more subscriber CPE devices 106. Distribution may be linear, non-linear (e.g., unicast, etc.), or a combination thereof.

With reference to the subscriber's CPE systems or devices 106, various programming modules may be included therewith or otherwise executable thereby. CPE devices 106 may include any number of subscriber devices that are at least operable to receive A/V content over the second distribution network 112 (e.g., over a cable network, a satellite network, and/or an IP network), including, but not limited to, a media gateway device, a set-top box, a television (e.g., a tru2way enabled television or other presentation device), a cable card, a digital video recorder (DVR), a media computer system, and the like. A CPE device 106 may be a display only device (e.g., television, monitor, etc.), a transcode device (e.g., a media gateway, etc.), or a combination device (e.g., a tru2way enabled television, a media computer system, etc.). It is further appreciated that a CPE device 106 may facilitate transmission of content with other CPE devices 106 or other subscriber target devices that may not perform all of the functions as the CPE device 106, such as, but not limited to, a digital media player, a smart phone, a personal computer, a television, a DVR, a storage device (e.g., internal or external hard drive or other memory device, etc.), and the like. Example programming modules include, but are not limited to, a CAS operations module 160, a DRM operations module 162, a content manipulation module 164, a presentation module 166, a storage module 168, and a transmission or sharing module 170. The CAS operations module 160 performs CAS authorization between the CPE device 106 and the distribution service provider system 104 for A/V content received that includes a CAS application.

The DRM operations module 162 performs DRM authorization with the content provider system 102 and/or a third-party DRM system 108, according to the DRM application provided with the A/V content. In some embodiments, the DRM operations module 162 facilitates removal of DRM applications from A/V content to allow subsequent processing of the content, as well as the subsequent re-application of the DRM application with the A/V content. In one embodiment, the operations provided by the DRM operations module 162 are performed within a trusted domain of the CPE device 106 according to the DRM application rights and limitations, much like the trusted domain described with reference to the distribution service provider system 104. A/V content may be processed by the CPE device 106, such as to enable modifying content (e.g., altering content resolution) before transmitting it to another of the subscriber's target device, or to enable modifying or changing the DRM application to a different DRM application supported by the target device if allowed by the original DRM application received with the A/V content.

Accordingly, the DRM operations module 162 includes logic operable to execute, and perform DRM operations and authorizations with, the DRM application transmitted or associated with received A/V content. The DRM operations may be performed in real- and/or near real-time. The DRM operations module 162 may further store or otherwise access authorization, encryption, and decryption information, including, but not limited to, certificate keys, hard-coded encryption schemes, encryption/decryption logic (e.g., a codec for encryption and/or decryption, etc.), and/or renew keys. For example, in one embodiment, the DRM operations module 162 includes multiple keys with at least one key or set of keys operable to facilitate DRM authorization, encryption, and/or decryption, and at least one key or set of keys to facilitate the renewal of keys, in case of a breach of the DRM information. In addition to renewing keys or other DRM information after a breach, the DRM operations module 162 and/or the DRM application provided with the A/V content may also be self-renewable by downloading a new or updated DRM application over a network when executed (e.g., if being executed after a period of time from original receipt of the content, which may occur in time-shifting scenarios, such as when storing content in memory or with a DVR).

Because the CPE device 106 (and/or other subscriber target devices) may vary as to what type of operations may be performed (e.g., display only devices, transcoding only devices, or a combination thereof, etc.), the DRM operations module 162 may further include logic operable to permit implementing various level of DRM logic specific to the type of CPE device 106 executing the DRM application. For example, the DRM operations module 162 may include logic that will alter the DRM application received with A/V content according to the level of DRM support and/or type of compatible DRM application intended to be provided by the CPE device 106 (e.g., alter the DRM application resolution/transcode per the device's capabilities), so long as the DRM operations are within the rights and limitations prescribed by the original DRM application transmitted with the A/V content. It is even possible, in one embodiment, that the DRM operations module 162 be operable to execute more than one DRM application type, such as to perform transcoding or other DRM alterations, or such as if the A/V content received includes two DRM application types (e.g., one for the main content and one for advertising or other content spliced into the content stream).

The content manipulation module 164 is utilized to facilitate processing A/V content. The presentation module 166 includes the software programming and/or hardware that allows presenting the A/V content, such as displaying audio and/or visual content and graphic content by a television, computer, monitor, or projector, playing audio content by an audio device, operating software content by a computer, and the like. The storage module 168 facilitates the storage of A/V content within the CPE device 106 or a separate storage device. It is appreciated, much like transmitting or sharing content with another target device, storage may call for content alteration (e.g., if the content resolution must be reduced for storage, etc.) and/or DRM application modification, change, or removal prior to storage, all of which may be done by the storage module 168 and/or the content manipulation module 166. The transmission or sharing module 170 facilitates the transmission of A/V content from the CPE device 106 on which the A/V content was originally received (or an intermediary CPE device) to another CPE device 106 or other subscriber's target device.

The third-party DRM system 108 may include similar programming logic to enable: applying DRM applications to A/V content on behalf of a content provider; sharing DRM applications with content providers; distributing DRM host software to subscriber devices; authorizing DRM content between subscriber devices, distribution service providers, or other systems; and the like.

According to one embodiment, the first distribution network 110 may include any number of private networks, which may be wired or wireless, accessed by one or more content provider systems 102 and one or more distribution service provider system 104. Private network links may exist between a distribution service provider system 104 and each content provider system 102. In other embodiments, the first distribution network 110 may be any number of public networks (or in combination with private networks), such as the Internet or any other wired or wireless network. The second distribution network 112 may include any number of networks, which may be public, private, or a combination thereof, including a cable television broadcast network (e.g., fiber network, coaxial network, a hybrid fiber-coaxial network, etc.), a satellite broadcast network, an IP network, and the like, which are operable to support transmission according to various media/content and transmission protocols (e.g., MPEG 2, ISO 13818-1, etc.). The first and second distribution networks 110, 112 may support downstream, upstream, and/or bi-directional communications. The network 114 may be any public or private network, wired or wireless, such as the Internet, or a local area network, a wide area network, a publicly switched telephone network (PSTN), an intranet, intermediate handheld data transfer devices, and/or any combination thereof. It is appreciated that the network 114 may be accessible via a wireless device (e.g., smart phone, etc.) via a wireless network provider (e.g., cellular network, Wi-Fi, WiMAX, etc.). Due to network connectivity, various methodologies described herein may be practiced in the context of distributed computing environments. Although the system 100 is shown for simplicity as including one intervening first distribution network 110, second distribution network 112, and network 114, it is to be understood that any other network configuration is possible, which may optionally include a plurality of networks, each with devices such as gateways and routers, for providing connectivity between or among networks.

Figure 2:
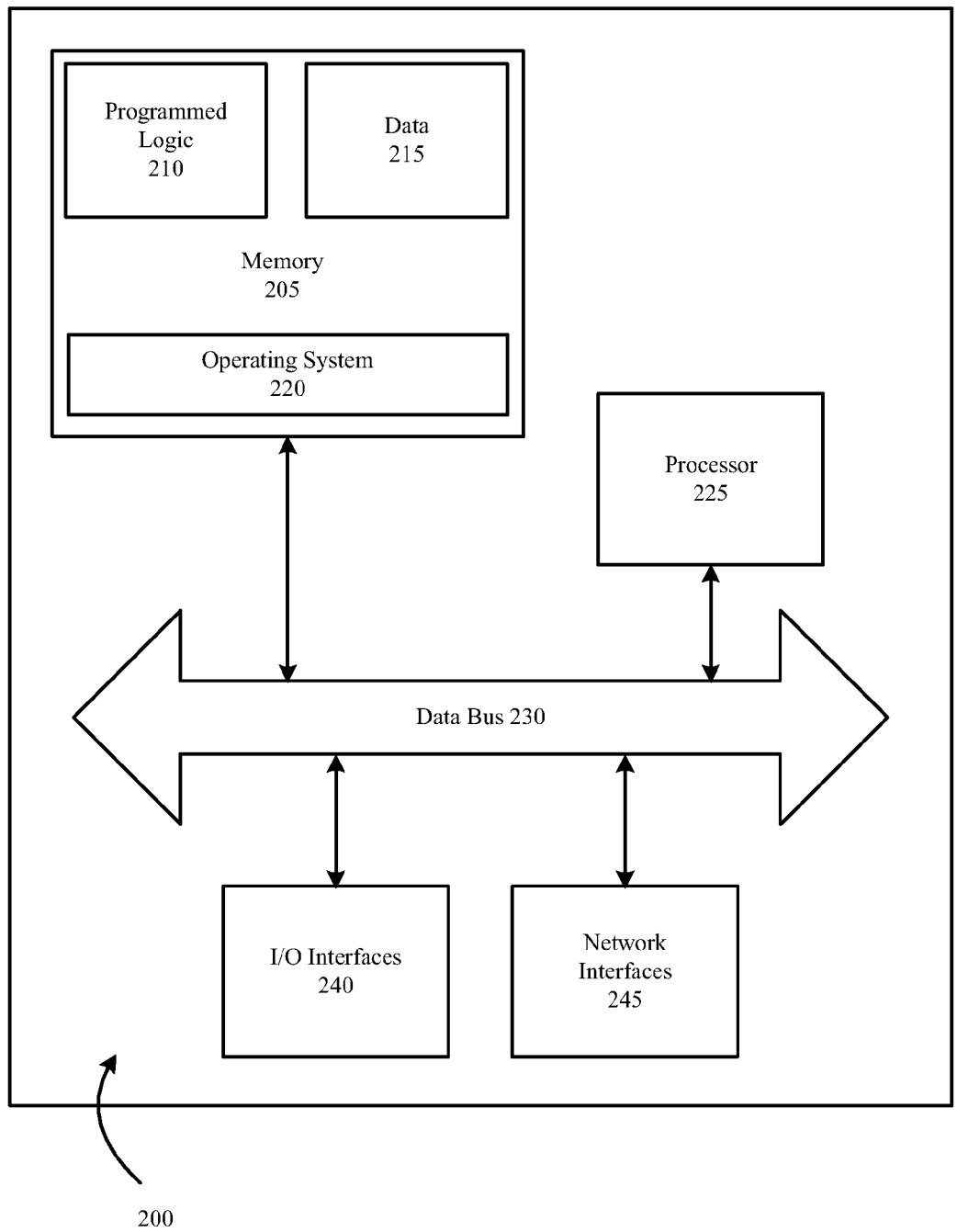
FIG. 2 is a block diagram illustrating a computer system, according to an example embodiment.

In addition, the system 100 shown in and described with respect to FIG. 1 is provided by way of example only. Numerous other operating environments, system architectures, and device configurations are possible. For example, any of the aforementioned systems may be provided by way of a distributed computing environment, such that some functions are provided by one system or system component and other functions are provided by others, or such that some functions are replicated across multiple systems, such as to provide redundant processing or back-up capabilities. Moreover, while names are explicitly provided for various programming modules, it is appreciated that any of the aforementioned features or below-described operations may be performed within the same or different modules, and that the names are provided for illustrative purposes only and are not intended to constrain the operations described herein. Accordingly, while the example embodiments described herein may refer to functionality and/or components as provided by a single system, it is appreciated that the functionality and/or components may be distributed across multiple computers or other systems. Embodiments of the invention therefore should not be construed as being limited to any particular operating environment, system architecture, or device configuration.

Operational Overview

Figure 3:
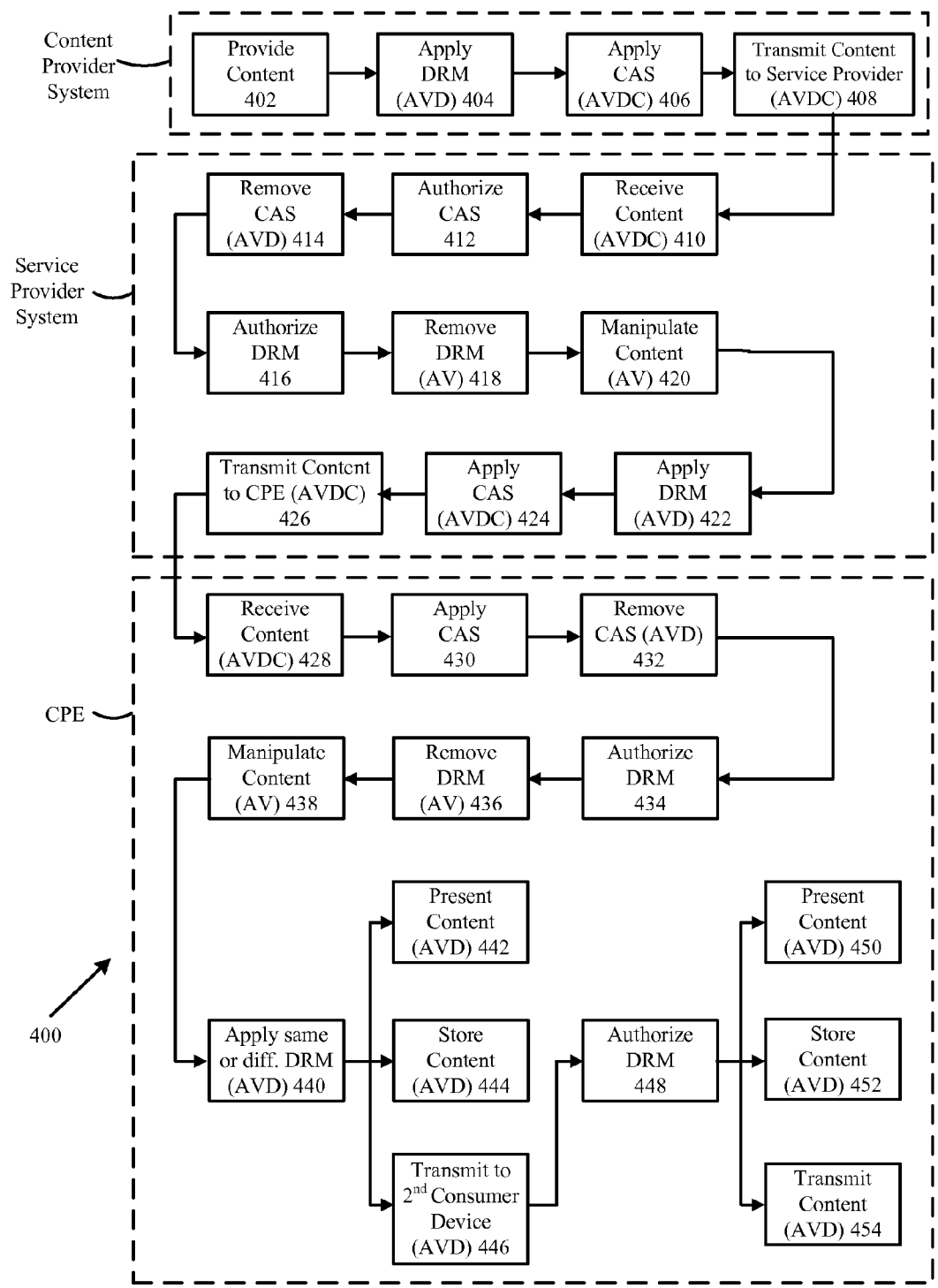
FIG. 3 is a flow diagram illustrating a method for providing separable DRM, according to an example embodiment.

Example operations of the system 100 will now be described in more detail with reference to FIGS. 3-7C. FIG. 3 provides a flowchart of an example method 300 for providing separable DRM with A/V content. Various operations of the method can be performed by one or more of the programming modules associated with the content provider system 102, the distribution provider system 104, the CPE device 106 or other associated target devices, and/or a third-party DRM system 108, such as are described with reference to FIG. 1. The flowchart illustrates certain operations as occurring within or otherwise performed by or on behalf of the content provider system 102, the distribution provider system 104, and the CPE device 106, according to one embodiment; however, it is appreciated that, in other embodiments, some of the operations may be performed by different systems.

The method 300 may begin at block 302, in which A/V content is made available for distribution from a content provider system 102. In one embodiment, the content provider system 102 stores or otherwise has access to all A/V content being distributed. However, in other embodiments, at least some of the A/V content may be obtained from a remote storage system over a network, which may be maintained by the content provider system 102 or by a third-party content provider or other system. The A/V content is formatted according to the network standards over which it will be distributed as well as, optionally, the device standards intended to present the content. It is appreciated, however, that A/V content in one format may subsequently be altered or formatted according to a second different format.

At block 304, the content provider system 102 applies or otherwise associates a DRM application to the A/V content. In one embodiment, instead of or in addition to that provided by the content provider system 102, a third-party DRM system 108 may apply or associate a DRM application to the A/V content.

Figure 7A:
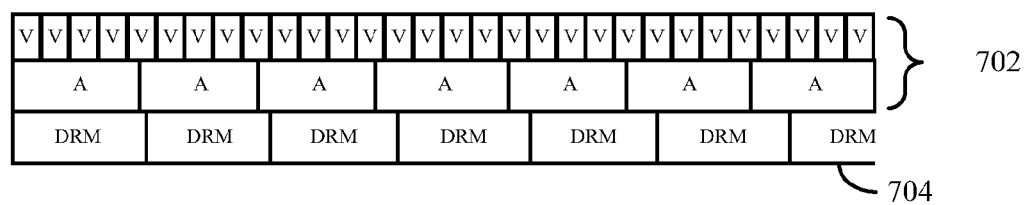
FIGS. 7A-7C are diagrams illustrating DRM applications associated with content, according to example embodiments.
Figure 7B:
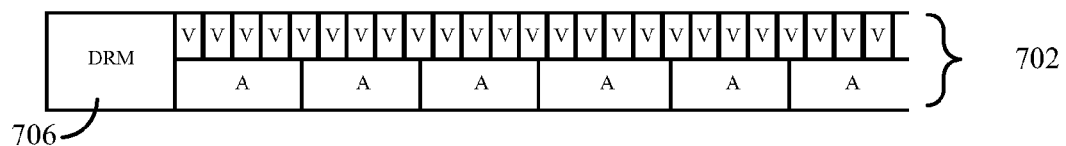
Figure 7C:
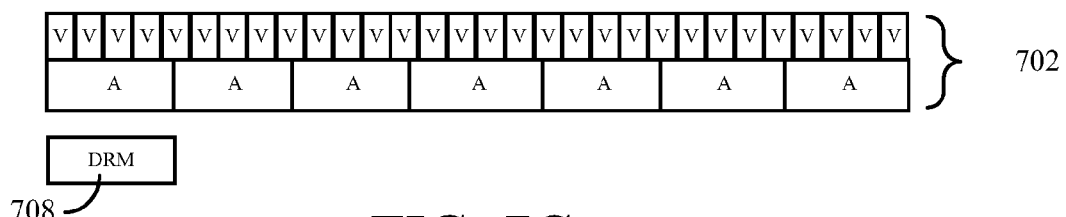

FIGS. 7A-7C illustrate example methods by which a DRM application can be applied to A/V content stream. FIG. 7A represents a DRM application 704 being applied to an A/V content stream 702 in a carrousel fashion, such that access to the DRM application 704 need not occur at the beginning of the A/V content stream 702, but may be gained at a number of points throughout the A/V content stream 702. This may be particularly useful if the A/V content stream 702 is a linear stream where a subscriber's point of initial access is likely undeterminable. FIG. 7B represents a DRM application 706 being applied at the beginning of an A/V content stream 702, which calls for acquisition of the A/V content stream 702, and thus the DRM application 706, at the beginning of the stream 702. This arrangement may be applicable for non-linear content delivery, such as with video on-demand (or other on-demand) assets, or other subscriber-requested downloads. FIG. 7C represents a DRM application 708 that is delivered separately from an A/V content stream 702, such as if transmitted out-of-band (e.g., simultaneously with acquiring the A/V content 702 or tuning to a channel) or if retrieved from a local or remote storage device, memory, or other system. As used herein, "AVD" refers to A/V content also containing or otherwise associated with a DRM application.

At block 306, the content provider system 102 applies a CAS application to the A/V content after applying the DRM application. The CAS application is utilized to control access to the A/V content by the service provider system. As used herein, "AVDC" refers to A/V content containing or otherwise associated with a DRM application and a CAS application. After block 306 is block 308, in which the content provider system 102 transmits the A/V content (AVDC) to the distribution service provider system 104, such as over the first distribution network 110 described with reference to FIG. 1. Additional details regarding the operations of the content provider system 102 performing these operations is provided with reference to FIGS. 4A-4C and 5A.

Accordingly, at block 310, the distribution service provider system 104 receives the A/V content having both the CAS application and the DRM application applied or otherwise associated therewith (AVDC). At block 312, the distribution service provider system 104 performs CAS authorization with the content provider system 102, such as over the first distribution network 110 (or over any other network). In other embodiments, CAS authorization may be based on locally stored CAS information (e.g., certificates, keys, etc.) that does not require real-time network communication. After determining that the distribution service provider system 104 is authorized to receive the A/V content, the CAS application is removed at block 314, resulting in A/V content containing the DRM application but no CAS application (AVD).

Similarly, at block 316, the distribution service provider system 104 performs DRM authorization, which may be performed with the content provider system 102, with a third-party DRM system 108, and/or based on locally stored DRM information. After authorization of the distribution service provider system 104 according to the DRM application, the DRM application is stripped or otherwise removed from the A/V content at block 318, resulting in A/V content having no DRM or CAS applications, simply referred to herein as "AV". As discussed above, the DRM application is removed from the A/V content within a trusted domain of the distribution service provider system 104, protecting the A/V content from unauthorized uses when stripped of the DRM application. At block 320, any manipulation or other processing of the A/V content may be performed, such as to insert advertisements, perform rate shaping, alter resolution, alter encoding, and the like, all of which may also be performed within the trusted domain of the distribution service provider system 104. After any desired processing is performed, the DRM application, which may be the same or a different DRM application, is re-applied to the A/V content at block 322 within the trusted domain, resulting in AVD. In one embodiment, the resulting A/V content (AVD) may include two types of DRM applications, such as if content from two different content providers, which are protected by two different DRM application types, are combined together by the distribution service provider system 104. It is appreciated that, in some embodiments, the DRM application may not be removed from the A/V content, such as if the A/V content does not need to be processed prior to distribution to a subscriber.

At block 324, a CAS application, which typically, but not always, will be a different CAS application from that provided by the content provider system 102 at block 306, is applied to the A/V content, resulting in AVDC. The CAS application applied at block 324 may be used to authorize access to the A/V content by a subscriber CPE device 106. Finally, at block 326, the A/V content (AVDC) is distributed over the second distribution network 112 to one or more subscribers' CPE device 106.

The subscriber's CPE device 106 receives the A/V content containing both a separate DRM application and CAS application (AVDC) at block 328. Following block 328 is block 330, in which the CPE device 106 performs CAS authorization with the distribution service provider system 104. It is appreciated that, like that described above, CAS authorization may be performed over the second distribution network 112 (or over any other network), or may be performed based on locally stored CAS information (e.g., certificates, keys, etc.) that does not require real-time network communication. Upon confirming the CPE device 106 is authorized to access the A/V content according to the CAS application, the CAS application may be removed from the A/V content (AVD) at block 332. After removing the CAS application, the CPE device 106 performs DRM authorization with the content provider system 102 and/or a third-party DRM system 108 at block 336, according to the DRM application applied to the AVD.

If authorized according to the DRM application, and if desired, the CPE device 106 may optionally remove the DRM application at block 336 and subsequently manipulate the A/V content (AV) at block 338. For example, manipulation may be performed to reduce resolution or otherwise alter encoding of the A/V content, insert content, and the like. Content manipulation may be performed to enable storing the A/V content or transferring the A/V content to another target device, according to the DRM application and the target device requirements. After performing any desired content manipulation, the CPE device 106 may then, at block 340, re-apply the same or a different DRM application to the A/V content (AVD). A different DRM application may be applied to the A/V content in examples, such as if a lower DRM resolution is required or a different DRM protection scheme is required by a target device. Altering the DRM application may, in one embodiment, be performed according to the rights and limitations of the originally provided DRM content, such as to only provide the same or fewer rights as were originally allowed.

Following block 340, the CPE device 106 may perform one or more of blocks 342, 344, and/or 346, which include presenting the content (e.g., displaying, playing, operating, etc.), storing the content (e.g., in a DVR, memory, or other storage device, etc.), or transmitting to a subscriber's second target device (e.g., transmitting to a smart phone, a digital media player, etc.), respectively. If transmitted to a target device, blocks 348-354 follow, in which DRM authorization is performed, and one or more of the same options of presenting, storing, and/or transmitting may be performed.

Accordingly, the method 300 may end after block 354, having transmitted A/V content from a content provider via a distribution service provider to a CPE device 106 and subsequently a secondary target device, or after any one of blocks 342-346, having presented, stored, and/or transmitted the A/V content.

Figure 4A:
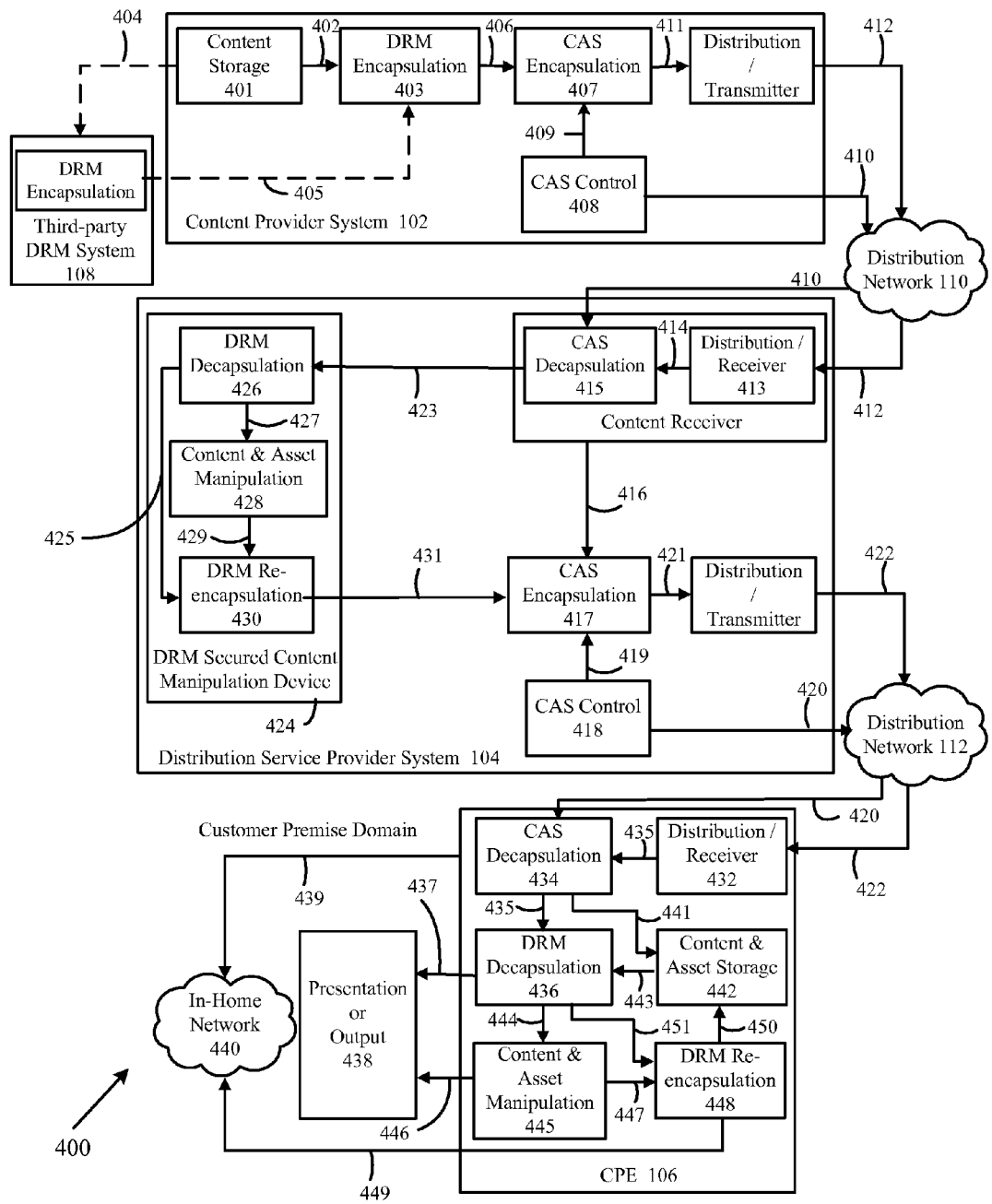
FIGS. 4A-4C are block diagrams illustrating operations of a system providing separable DRM, according to example embodiments.
Figure 4B:
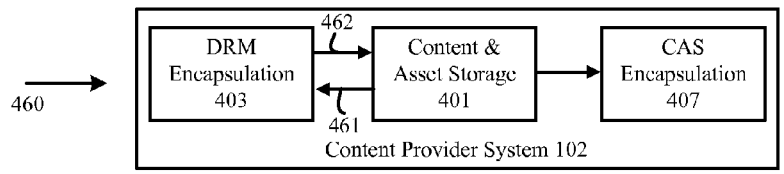
Figure 4C:
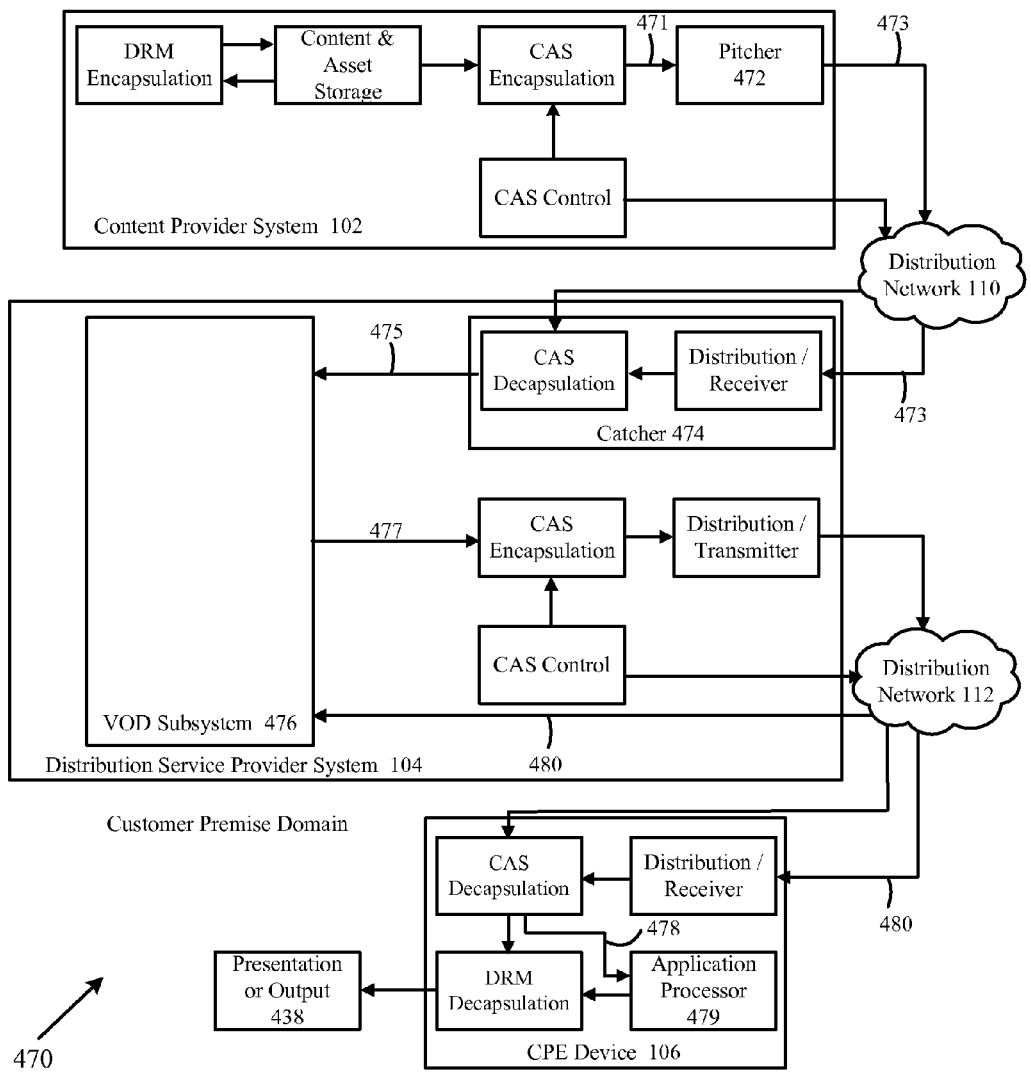

FIGS. 4A-4C are block diagrams illustrating example operations and data flow of systems providing separable DRM, according to example embodiments. While the method 300 illustrated in and described with reference to FIG. 3 represents general operations that may be performed to provide separable DRM with A/V content, the example operations illustrated in FIGS. 4A-4C describe in additional detail various illustrative scenarios, according to example embodiments. With reference to FIG. 4A, the block diagram 400 represents one embodiment of illustrative operations and data flow performed by systems for providing separable DRM, such as the systems described with reference to FIG. 1.

According to one embodiment, A/V content is stored 401 at a content provider system 102, such as within a content storage system, which may include a storage server, tape storage, disk storage, and/or other memory or data storage device where any A/V content is stored for distribution to subscribers (via a distribution service provider, for example). As described above, in other embodiments, A/V content may be stored remotely from the content provider system 102, and may be accessed over a network or otherwise prior to applying DRM applications and distributing to subscribers. The content storage system may be in communication with a DRM operations module of the content provider system over an interface, which may be any wired or wireless communications interface, such as an IP interface allowing for real-time streaming of A/V content between the content storage system and the DRM operations module. Similarly, for any of the communications and/or transmission operations within a single system described with reference to FIGS. 4A-4C, the transmissions may be within a single device component, or may be over any private, semi-private, or public wired or wireless communications link between two systems or system components. Moreover, in some embodiments, data and/or content may be transmitted by a physical exchange of storage medium, such as tape storage, disk storage, or other data storage devices exchangeable between parties.

Accordingly, A/V content may be communicated 402 from the content storage system to the DRM operations module for applying a DRM application 403 (also referred to herein as "DRM encapsulation") to respective A/V content. The DRM operations module may be any system or system component (including any programming module) that processes A/V content 403 such that it is protected by a DRM application and has the DRM application properly associated therewith. According to various embodiments, the particular DRM application provided may be decided by a content provider system, by the subscriber device on which the content is intended to be used, by the distribution service provider, and/or by a third-party DRM provider. In addition, the DRM encapsulation 403 may be performed the content provider system 102, or by a third-party DRM system 108. For example, if DRM encapsulation 403 is performed by a third-party DRM system 108, the A/V content may be communicated 404 from the content storage system to the third-party DRM system 108 over a network, instead of internally within the content provider system 102, after which it is transmitted back 405 to content provider system 102, such as to the DRM operations module, the content storage system, or the CAS operations module. Otherwise, a third-party DRM system 108 may have access to the A/V content within the content provider system 102 to allow applying the DRM thereto.

After DRM encapsulation 403, the A/V content is transmitted 406 to a CAS operations module to apply a CAS application to the A/V content (also referred to herein interchangeably as "CAS encapsulation") 407. The CAS application generally protects access to the A/V contents, as decided by the content provider. In coordination with the CAS operations module, CAS control 408 controls the encryption and entitlements associated with the A/V content according to the CAS application applied 407. Accordingly, encryption control 409 is managed between the CAS control component 408 and the CAS operations module component performing CAS encapsulation 407. Content entitlements 410 are managed between the CAS control component 408 and the intended recipient (in this case the distribution service provider system 104) over a network, such as the first distribution network 110. In one embodiment, content entitlement operations 410 may be performed over a portion of the first distribution network 110 comprising a dedicated, private or semi-private link between the content provider system 102 and the distribution service provider system 104 (e.g., via out-of-band communications).

After applying both the DRM application and the CAS application to the A/V content, resulting in AVDC, the A/V content is transmitted 411 to distribution equipment for distribution 412 to the distribution service provider system 104. The A/V content is distributed 412 over the first distribution network 110 in its DRM-protected and CAS-controlled form (AVDC). According to one embodiment, the communications link over which the A/V content is distributed 412 may differ from the communications link over which the CAS entitlements 410 are transmitted.

At the distribution service provider system 104, the A/V content (AVDC) is received 412 over the first distribution network 110 and the CAS entitlements 410 are received separately over the first distribution network 110. As mentioned, the communications link over which the A/V content is distributed 412 may, but need not, differ from the communications link over which the CAS entitlements 410 are transmitted. In another embodiment, they may be transmitted over the same link within the content distribution network 110. A distribution/receiver 413 or other associated system, component, and/or programming module may be utilized by the distribution service provider system 104 to receive 412 the A/V content, while a CAS operations module operable to remove the CAS application (also referred to herein interchangeably as "CAS decapsulation") 415 may receive the CAS entitlements 410. According to one embodiment, both the distribution/receiver and the CAS operations module may be included or otherwise associated with a content receiver component of the distribution service provider system 104.

The CAS operations module additionally receives 414 the A/V content and performs CAS authorizations based on the A/V content CAS application and the CAS entitlements received. If entitled, according to the CAS authorization results, the CAS operations module performs CAS decapsulation 415 to remove the CAS application from the A/V content, resulting in an A/V stream having only the DRM application applied or otherwise associated therewith (AVD).

According to one embodiment, the distribution service provider may not desire to remove the DRM application, and thus can transmit 416 the A/V content with the DRM application (AVD) for CAS encapsulation 417, such as by a CAS operations module (which may be the same or different module that performs CAS decapsulation 415). For example, according to one embodiment, the distribution service provider 104 includes its own CAS control 418, similar to the CAS control 408 of the content service provider, which manages encryption 419 when performing CAS encapsulation 417 and manages CAS entitlements 420 with a subscriber CPE device 106. After CAS encapsulation 417 is performed by the distribution service provider system 104, resulting in A/V content having both the DRM application (as provided by the content provider) and the CAS application (provided by the distribution service provider) (AVDC), the A/V content can be transmitted 421 to distribution equipment for distribution 422 to the subscriber's CPE device 106 over the second distribution network 112.

Otherwise, according to another embodiment, if the distribution service provider does intend to process the A/V content, such as to perform manipulations, alterations, additions, and the like, the DRM application can be removed within a trusted domain 424 of the distribution service provider system 104. Accordingly, after CAS decapsulation 415, the resulting A/V content (AVD) can be transmitted 423 to the trusted domain 424, which may be a separate device or system, or it may be a component or module within or associated with another distribution service provider component. Within the trusted domain 424, a DRM operations module can first capture, store, and/or share 425 necessary DRM application information to allow re-application of the DRM application to the A/V content stream (referred to herein interchangeably as "DRM re-encapsulation") 430. For example, this DRM information may be shared 425 with the same or different DRM operations module within the trusted domain 424. After capturing, storing, and/or sharing 425 the DRM information, the DRM operations module can remove the DRM application from the A/V content (referred to herein interchangeably as "DRM decapsulation") 426 to allow subsequent content manipulation or other processing.

After the DRM application is removed 426, the A/V content (AV) can be transmitted 427 to a content manipulations module to perform content manipulation 428. As discussed above, content manipulation 428 is also performed within the trusted domain 424 of the distribution service provider system 104, so as to adequately protect the A/V content from unauthorized use while stripped of its DRM application.

Upon completion of content manipulation 428, the manipulated A/V content is transmitted 429 to the same or different DRM operations module to perform DRM re-encapsulation 430, also within the trusted domain 424. According to one embodiment, DRM re-encapsulation may re-apply the same or similar DRM application as is originally provided with the A/V content from the content provider system 102. Although, in other embodiments, a different or altered DRM application may be applied. For example, a different DRM application may be applied if the intended recipient subscriber's device operates with a different DRM application, or if the original DRM application is no longer compliant with the A/V content after manipulation 428 (e.g., if the content resolution has been downgraded, the DRM resolution may be downgraded, etc.).

Upon DRM re-encapsulation 430, the A/V content (AVD) is transmitted 431 to the CAS operations module to perform CAS encapsulation 417 and subsequent distribution 422 over the second distribution network 112 in accordance with that described above.

Accordingly, the A/V content (AVDC) is received 422 by a receiver device 432 of the subscriber's CPE device 106 over the second distribution network 112 for presentation, storage, transfer, or any other permissible use by the subscriber. As described above, the CPE device 106 may be any device operable to connect to the second distribution network 112 and receive and perform subsequent processing on the A/V content, such as, but not limited to a set-top box, media gateway, television, a cable card, a personal computer and associated software, hardware, and/or firmware, and the like. In addition, CAS entitlements 420 from the distribution service provider system 104 may also be transmitted over the second distribution network 112, which may be over the same or a different network connection as that over which the A/V content is distributed. For example, in one embodiment, CAS entitlements 420 may be transmitted to a CAS operations module of the CPE device 106 by out-of-band communications in association with the in-band distribution 422 of the A/V content. The A/V content is passed 433 from the receiver 432 to the CAS operations module, to enable the CPE device 106 to perform CAS authorization in accordance with the CAS application to authorize access to the A/V content. Upon performing CAS authorization, the CAS operations module performs CAS decapsulation 434 to remove the CAS application from the A/V content, resulting in A/V content having only the DRM application applied or associated therewith (AVD).

It is appreciated that the DRM application and associated rights and limitations will guide how the CPE device 106 and other target devices, storage systems, etc., can utilize the A/V content when under the protection of the DRM application. For example, various DRM protection rights and limitations include, but are not limited to, copy control, movement control, consumption (use) control, propagation control, output control, scrambling control, storage control, and/or transcoding control. According to some embodiments, copy and movement controls may guide whether or how many times the A/V content can be copied by a device (e.g., copy once, copy never, copy freely, copy no more, etc.) or how long the A/V content may be retained in memory (e.g., a retention limit set to 24 hours, for example). According to some embodiments, consumption controls guide whether and when the A/V content can be viewed, how often or how many times the A/V content can be viewed, and/or how many simultaneous viewings of the A/V content can occur. According to some embodiments, propagation controls may guide the localities and domains to which the A/V content can be moved and in which the A/V content can be viewed (e.g., in local proximity, within a managed domain, anywhere, etc.). According to some embodiments, output controls guide the means by or over which the A/V content can be output, such as controlling the output format (e.g., analogue SD or analogue HD, etc.) or controlling the connection protocol (e.g., IEEE 1394, DVI, HDMI, Ethernet, USB, STA, any DTCP/IP device, resolution limits, etc.). According to some embodiments, storage controls provide guidance as to the types of devices and/or storage medium on which the A/V content can be stored (e.g., DVD-R media, DVD-RAM media, DVD-RW media, DVD-VR format, HD-DVD, Blu-ray Disc, a local hard drive, an external hard drive, a digital media player, etc.). According to some embodiments, the transcoding controls guide the types of formats or encoding in which the A/V content is allowed to be transcoded. It is appreciated that the aforementioned DRM rights and limitations are provided for illustrative purposes, and that any other rights and limitations can be provided according to various embodiments.

In one embodiment, if the A/V content is to be presented (e.g., displayed, played, etc.) in real-time as received over the second distribution network 112, the A/V content may be passed 435 to a DRM operations module to perform DRM authorization (e.g., with the content provider system 102 and/or a third-party DRM system 108) and DRM decapsulation 436 if so authorized, resulting in A/V content stripped of its DRM (AV) for presentation, after which it will be transmitted 437 from the CPE device 106 for display, such as to a television, projector, monitor, audio system, or other presentation or output device 438. Any conventional interface between the CPE device 106 initially receiving the A/V content and a presentation or output device may be utilized. In one example, this interface between the CPE device 106 and the presentation or output device 438 may include link-level DRM or other encryption and/or protection means, such as, but not limited to, a Digital Transmission Content Protection (e.g., DTCP or DTCP/IP) protocol.

In another instance, when the A/V content is to be shared or otherwise transmitted over an in-home network 440, the A/V content (AVD) may be transmitted 439 over the in-home network 440 after CAS decapsulation 434 to one or more other target devices in communication with the in-home network 440. In one embodiment, the in-home network 440 may likewise include DTCP or DTCP/IP protocol; though, it is not required, as the A/V content remains protected by the DRM application. When accessed and utilized by a target device in communication with the in-home network 440, the DRM application rights and limitations will be authorized by that device's DRM client module with the appropriate party (e.g., with the content provider system 102 and/or a third-party DRM system 108).

In another instance, the A/V content may also be stored 442 within a content storage system, such as, but not limited to, a computer hard drive, another memory device, a DVR, and the like. In one embodiment, the A/V content may be transmitted 441 after CAS decapsulation 434 while retaining the DRM application (AVD) to the content storage system for content storage 442. In another embodiment, however, the A/V content may be transmitted (not shown) after DRM decapsulation 436 to the content storage system, allowing the A/V content to be stored without DRM protection. After storage 442, the A/V content may be presented via the presentation or output device 438, such as by being passed 443 through the DRM operations module to perform DRM decapsulation 436 prior to transmission 437 to the presentation or output device 438.

According to one embodiment, the DRM application may call for the A/V content to be modified or otherwise processed prior to transmitting from the CPE device 106. Accordingly, after DRM decapsulation 436, the A/V content can be passed 444 to a content manipulations module for processing 445. For example, the copy, consumption, or transcoding controls may call for altering the resolution of the A/V content before transmitting 446 to the presentation or output device 438 or transmission over the in-home network 440. In one embodiment, after processing 445 the A/V content, the A/V content is transmitted 447 to a DRM operations module for DRM re-encapsulation 448 prior to transmission 449 over the in-home network 440 or transmission 450 to a content storage system for storage 442. In another embodiment, instead of performing content processing 445, after DRM decapsulation 436 (and/or after DRM authorization), the A/V content can be transmitted 451 to the DRM operations module for DRM re-encapsulation 448 prior to transmission 449 over the in-home network 440 or transmission 450 to a content storage system for storage 442.

Accordingly, the block diagram 400 illustrates an example in which A/V content is distributed by a content service provider with both CAS and DRM protection applied thereto. Upon receipt, the distribution service provider is capable of removing both the CAS application and, if called for to perform content manipulation, to remove the DRM application. Prior to transmission to the subscriber, the DRM application can be re-applied, as well as the same or a different CAS application. Upon receipt at the subscriber's CPE device 106, CAS authorization and removal and DRM authorization and removal are performed independently, CAS operations being performed with the distribution service provider, but DRM operations being performed with the content provider and/or a third-party DRM provider. Thus, according to this system, as a result of providing a DRM application that is separate from the CAS application, and which is provided by or on behalf of the content provider and not by the distribution service provider, the distribution service provider is able to focus on content preparation and distribution without having to manage, implement, and coordinate a DRM solution.

FIG. 4B illustrates a block diagram 460 that represents another embodiment of illustrative operations and data flow performed by a content provider system 102, allowing DRM encapsulation 403 to be performed off-line, not in real-time during the preparation and distribution of the A/V content. According to this embodiment, stored A/V content 401 is transmitted 461 from a content storage system to a DRM operations module for DRM encapsulation 403. Like that described with reference to FIG. 4A, DRM encapsulation 403 may be performed by the content provider system 102 or by a third-party DRM system 108 on behalf of the content provider system, or any combination thereof. After DRM encapsulation, the A/V content (AVD) is transmitted 462 back for storage 401 with the content storage system for subsequent distribution to a distribution service provider system. In one embodiment, CAS encapsulation 407 may be performed at or near the same time (e.g., off-line) as the DRM encapsulation 403; though, in other embodiments, CAS encapsulation 407 may be performed prior to distributing the A/V content to a distribution service provider. The remaining operations may be performed in the same or similar manner as are described with reference to FIG. 4A.

FIG. 4C illustrates a block diagram 470 that represents another embodiment of illustrative operations and data flow performed by one or more content provider systems 102, distribution service provider systems 104, CPE devices 106, and, optionally, third-party DRM systems 108. According to this embodiment, the operations illustrated by the block diagram 470 allow utilizing the systems for the preparation and distribution of A/V content that includes video on-demand assets (or other on-demand assets). Only those operations that differ from that described with reference to FIG. 4A will be described here.

With reference to the block diagram 470, a pitcher module 472 of the content provider system 102 is utilized to distribute A/V content that includes video on-demand (or other on-demand) assets (referred to for simplicity as "VOD assets"). Accordingly, the pitcher module 472 receives 471 the VOD assets having the CAS application and the DRM application applied thereto or otherwise associated therewith (AVDC). The pitcher module 472 can be any conventional pitcher device or programming logic as utilized in cable, satellite, or IP networks. The pitcher module 472 distributes 473 the VOD assets (AVDC) over the first distribution network 110 to a receiver within a catcher module 474 of the subscriber's CPE device 106. After performing CAS authorization and CAS decapsulation, the VOD assets (AVD) are passed 475 to a video on-demand subsystem 476 of the distribution service provider system 104. According to one embodiment, within the video on-demand subsystem 476, the VOD assets may be manipulated or otherwise processed by removing and subsequently re-applying the DRM application, similar to that described with reference to FIG. 4A. In this manner, the video on-demand subsystem 476 operates as a trusted domain and may include or otherwise perform the same or similar functions as a DRM operations module. However, in other embodiments, the DRM application may be retained and no asset manipulation performed within the video on-demand subsystem 476. From the video on-demand subsystem 476, the VOD assets are transmitted 477 back to a CAS operations module for CAS encapsulation and then to a distribution module for distribution to a subscriber's CPE device 106 over the second distribution network 112, in the same or similar manner as is described with reference to FIG. 4A.

The CPE device 106 includes a specifically configured on-demand application processor module 479 operable for processing on-demand content. Accordingly, after CAS decapsulation, the VOD assets are transmitted 478 to the on-demand application processor module 479 for processing the VOD assets prior to DRM decapsulation for presentation via a presentation or output device 438. It is appreciated that, in some embodiments, depending upon how the DRM application is applied to or otherwise associated with the VOD assets from the distribution service provider system 104 (or the content provider system 102), the DRM application may be transmitted 480 over the second distribution network 112 independent of the respective VOD assets between the video on-demand subsystem 476 and the on-demand application processor module 479. This aspect represents instances in which the DRM application can be passed by out-of-band communications over the second distribution network 112.

Accordingly, the block diagram 470 illustrates an example in which A/V content containing VOD assets is distributed from a pitcher module 472 of a content provider system to a catcher module 474 of a distribution service provider system 104 for preparing the VOD assets for distribution to a subscriber's CPE device 106 having the CAS application and DRM application separately associated with the VOD assets.

Figure 5A:
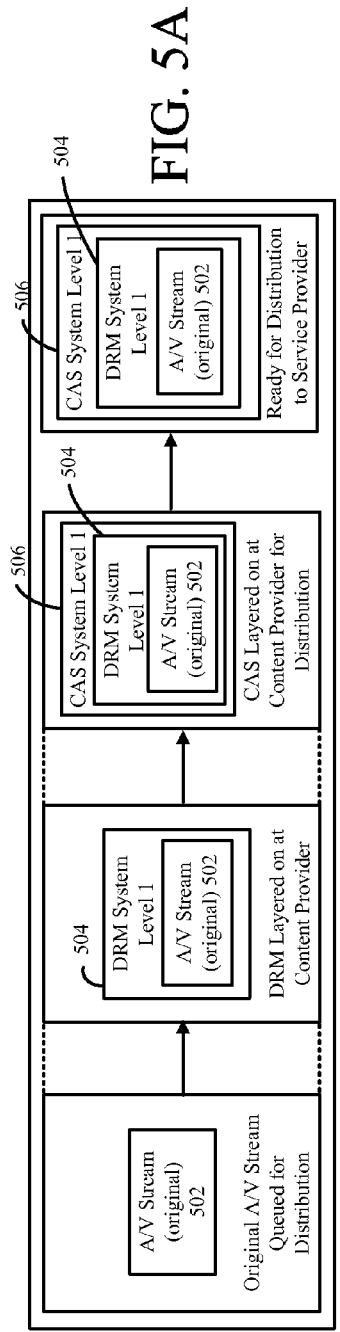
FIGS. 5A-5C are block diagrams illustrating operations performed on content, according to example embodiments.
Figure 5B:
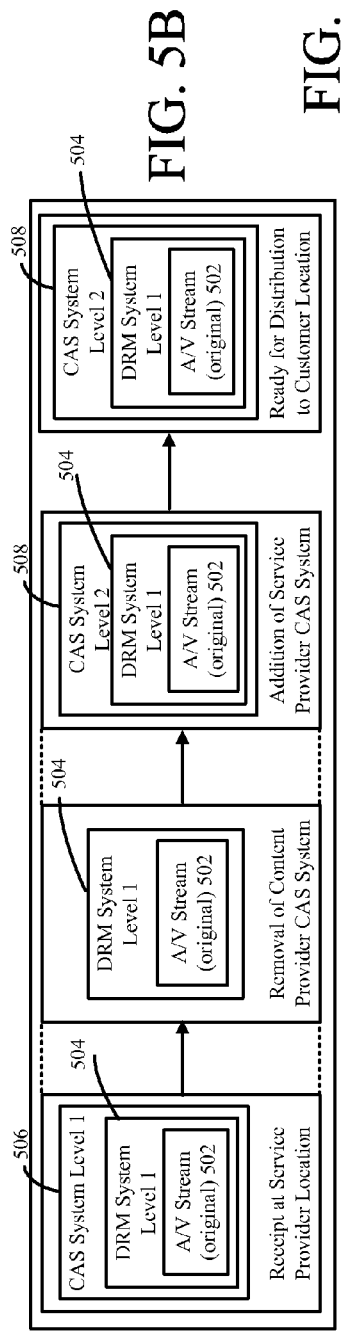
Figure 5C:
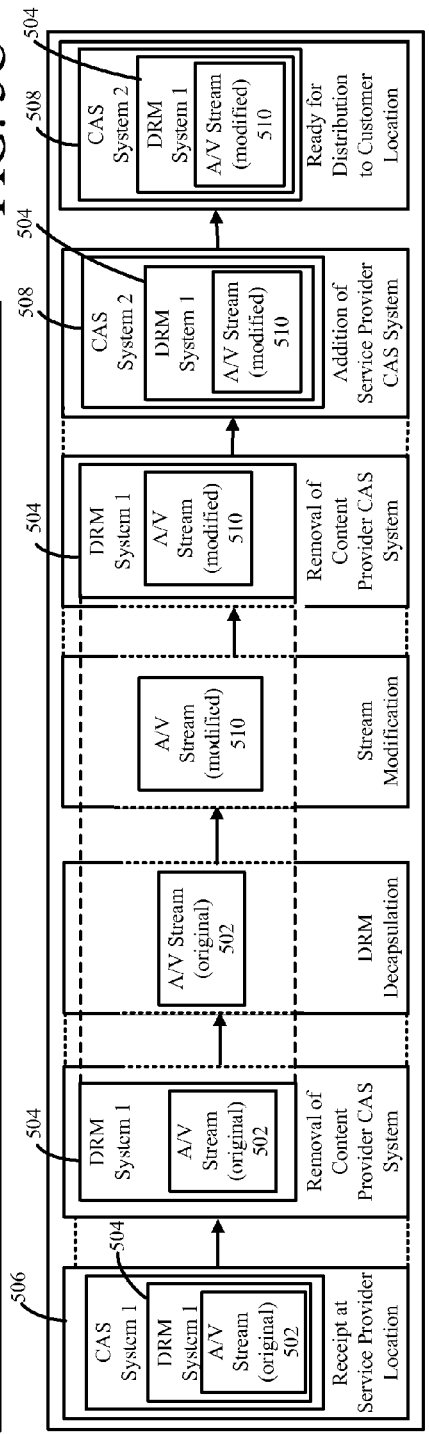

FIGS. 5A-5C provide illustrative representations of operations to apply and remove a CAS application and a DRM application for respective A/V content, according to various embodiments. The operations illustrated in FIGS. 5A-5C represent the interim states of the A/V content and associated CAS application and DRM application during the operations performed with reference to FIGS. 4A-4C.

FIG. 5A illustrates the operations of applying a DRM application and a CAS application to original A/V content by the content provider system 102 prior to distribution to a distribution service provider system 104, according to one embodiment. Accordingly, original A/V content 502 is stored or otherwise made available at a content service provider system for distribution. Next, a DRM operations module applies a DRM application 504 to the A/V content 502, resulting in A/V content having a DRM application associated therewith (AVD). As described herein, the DRM application 504 may be applied by the content provider system 102, or may be applied by or with the assistance of a third-party DRM system 108. In one embodiment, the DRM application 504 is applied within the content provider system 102 hardware. However, in other embodiments, it is appreciated that the A/V content may be transmitted to a system remote from the content provider system 102 (e.g., a third-party DRM system 108) to apply the DRM application thereto. The DRM application may be associated with the A/V content according to any of the example embodiments described with reference to FIGS. 7A-7C.

After layering on or otherwise applying or associating the DRM application 502, the CAS application 506 is similarly applied to the A/V content 502 by a CAS operations module of the content provider system 102, resulting in A/V content 502, having both a DRM application 504 and a CAS application 506 associated therewith (AVDC) protecting access to and unauthorized use thereof. Accordingly, after layering the DRM application 504 and the CAS application 406, the A/V content (AVDC) is ready for distribution over the first distribution network 110 to a distribution service provider system 104.

FIG. 5A therefore represents a visual depiction of the original A/V content 502 in its various stages without and with the DRM application 504 and the CAS application 506, according to one embodiment. It is appreciated that, according to various embodiments, the CAS application 506 provided by the content provider system 102 may be interchangeably referred to herein as a content provider CAS application, a first CAS application, and/or a level 1 CAS application. Similarly, the DRM application 504 may be interchangeably referred to herein as a content provider DRM application, a first DRM application, and/or a level 1 DRM application.

FIG. 5B illustrates the operations of replacing a content provider CAS application 506 with a service provider CAS application 508 by the distribution service provider system 104 prior to distribution to a subscriber, according to one embodiment. After receipt of the A/V content 502 having both the DRM application 504 and the CAS application 406 supplied by the content providers system 102, a CAS operations module at the distribution service provider system 104 removes the content provider CAS application 506 from the A/V content 502 (AVD). Subsequently, which may be any time prior to distribution to the subscriber, the CAS operations module applies a second CAS application 508 to the A/V content (AVDC). While the content provider CAS application 506 facilitates CAS authorization between the distribution service provider system 104 and the content provider system 102, the service provider CAS application 508 facilitates CAS authorization between the subscriber CPE device 106 and the distribution service provider system 104 during content distribution to subscribers. It may be desirous to do so because the access allowed by the distribution service provider system 104 may be different than the access allowed by the subscriber device. Accordingly, after applying the service provider CAS application 508 to the A/V content 502, still retaining the DRM application 504, the A/V content (AVDC) is ready for distribution to one or more subscriber CPE devices 106.

FIG. 5C illustrates the operations of replacing a content provider CAS application 506 with a service provider CAS application 508 by the distribution service provider system 104 prior to distribution to a subscriber, as described with reference to FIG. 5B, in addition to processing the original A/V content 502 into modified A/V content 510, according to one embodiment. After the content provider CAS application 406 is removed from the original A/V content 502, a DRM operations module removes the DRM application 504 from the original A/V content 502. After removal of the DRM application 504, a content manipulation module may perform the desired content processing, resulting in modified A/V content 510. After modifying the A/V content 510, the DRM operations module continues to re-apply the DRM application 504 to the modified A/V content 510. This DRM decapsulation, content manipulation, and DRM re-encapsulation all occur within a trusted domain of the distribution service provider system 104. Finally, the CAS operations module subsequently applies a service provider CAS application 508 to the modified A/V content 510, which already includes the DRM application 504. After which, the modified A/V content 510 layered with both the DRM application 502 and the service provider CAS application 508 (AVDC) is ready for distribution to one or more subscriber CPE devices 106.

Accordingly, FIGS. 5A-5C illustrate A/V content in various stages of protection by one or more different CAS applications, DRM application, and optionally in modified form after modification by a distribution service provider. After the operations illustrated by either FIG. 5B or 5C, the A/V content (AVDC) is ready for distribution, being protected by a service provider CAS application and a DRM application applied by or on-behalf of a content provider.

FIGS. 6A-6D provide illustrative representations of operations performed by a subscriber CPE device 106 to remove a CAS application and alter the DRM application and/or modify the A/V content for subsequent uses, according to various embodiments. The operations illustrated in FIGS. 6A-6D represent the interim states of the A/V content and associated CAS application and DRM application, such as to alter between various types of DRM application association, as described by example with reference to FIGS. 7A-7C, and/or to alter the DRM application and/or A/V content for subsequent sharing, storage, and/or uses of the A/V content, as described by example with reference to FIGS. 3-4C.

FIG. 6A illustrates the operations of converting a DRM application 604 from being in carousel association with an A/V content stream 602 to a DRM application 614 placed before or at the beginning of the A/V content stream 602, according to one embodiment. As described above with reference to FIG. 7A, a DRM application 604 that is associated in carousel fashion at multiple locations along the A/V content stream 602 can be utilized during linear broadcasting. However, it may be desirable to alter the carousel DRM application 604 to a DRM application 614 place before or at the beginning of the A/V content stream 602 when storing the A/V content 602 within a content storage system, streamlining the subsequent processing and reducing storage space occupied, and/or permitting transfer to target devices.

Accordingly, with reference to FIG. 6A, an A/V content stream 602 may initially be received at a CPE device 106 having a DRM application 604 associated in carousel fashion and a service provider CAS application 606 (AVDC). A CAS operations module may then remove the CAS application 606 (AVD). After removal of the CAS application 606, a DRM operations module may then remove the carousel DRM application 604 and re-apply a DRM application 614 at or near the beginning of the A/V content stream 602. After applying the DRM application 614 to the beginning of the A/V content 602, the A/V content (AVD) may be stored on a content storage device, as described herein. It is appreciated that, according to one embodiment, the rights and limitations of the DRM applications and the associated DRM protocol are not actually changing, rather the placement or association of the DRM application with the A/V content is changing. It is also appreciated that, according to various embodiments, the DRM removal and re-application occur within a trusted domain of the CPE device 106, similar to the trusted domain described of the distribution service provider system 104, to protect unauthorized access and use of the A/V content 602.

FIG. 6B similarly illustrates the operations of converting a DRM application 604 from a carousel association with A/V content stream 602 to a DRM application 624 that is transmitted separately from the A/V content stream 602 (e.g., "out-of-band" DRM), according to one embodiment. As described above with reference to FIG. 7C, a DRM application 624 that is transmitted separately, such as via out-of-band communications, may also improve subsequent processing, simplify storage operations, and/or facilitate transfer of the A/V content 602 with target devices. Accordingly, the DRM application 604 initially associated with the A/V content 602 in FIG. 6B may instead be modified by a DRM operations module in a trusted domain to a DRM application 624 located separate from the A/V content stream 602, which permits subsequent separate transmission or sharing and/or separate storage of the DRM application 624 relative to the A/V content 602.

FIG. 6C illustrates the operations of converting a DRM application 614 that is associated at or near the beginning of the A/V content stream 602, such as is accomplished by the operations described with reference to FIG. 6A, to a DRM application 624 that is transmittable separate from the A/V content 602, such as is described with reference to FIG. 6B, according to one embodiment. It may be desirable to convert to a DRM application 624 that is transmittable separate from the A/V content 602 (also referred to as out-of-band DRM) to satisfy the DRM protocol requirements of a target device when transmitting the A/V content 602 for use with a target device. Accordingly, an A/V stream 602 may be retrieved from a content storage system, such as may have been stored by the operations described with reference to FIG. 6A, that includes a DRM application 614 at the beginning of the A/V content stream 602. Within a trusted domain of the CPE device 106, the DRM application 514 may be removed and replaced with an out-of-band DRM application 624. After applying the out-of-band DRM application 624 to the A/V content 602, the A/V content 602 is ready for transmission or sharing with a secondary target device (e.g., digital audio player, digital video player, smart phone, etc.).

FIG. 6D illustrates the operations of converting a DRM application 614 that is associated at or near the beginning of the A/V content stream 602 to a DRM application 624 that is transmittable separate from the A/V content 602, such as is described with reference to FIG. 6C, but also modifying the original A/V content 602 to modified A/V content 612. According to one embodiment, the DRM removal, the A/V content modification, and the DRM re-application occur within a trusted domain of the CPE device 106 to protect unauthorized access and use of the A/V content 602.

It is appreciated that, according to various other embodiments, any variation or combination of the DRM modifications described with reference to FIGS. 6A-6D may be performed. For example, with reference to FIG. 6D, instead of also converting the DRM application from one positioned at or near the beginning of an A/V content stream to an out-of-band DRM application, the same DRM application can be re-applied after modification of the A/V content. As another example, with reference to FIG. 6A, the A/V content stream may also be modified within the trusted domain prior to re-applying the DRM application and storage, like that described with to FIG. 6D.

Accordingly, embodiments illustrated and described herein provide a system or systems in which A/V content is distributed by a content service provider with both CAS and DRM protection applied thereto. Upon receipt, the distribution service provider is capable of removing both the CAS application and, if called for to perform content manipulation, to remove the DRM application. Prior to transmission to the subscriber, the DRM application can be re-applied, as well as the same or a different CAS application. Upon receipt at the subscriber's CPE device, CAS authorization and removal and DRM authorization and removal are performed independently, CAS operations being performed with the distribution service provider, but DRM operations being performed with the content provider and/or a third-party DRM provider. Thus, according to this system, as a result of providing a DRM application that is separate from the CAS application, and which is provided by or on behalf of the content provider and not by the distribution service provider, the distribution service provider is able to focus on content preparation and distribution without having to manage, implement, and coordinate a DRM solution. It is appreciated that these, and other advantages, will be apparent from the foregoing disclosure.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for providing content having digital rights management applications separable from other authorization applications, comprising:
a distribution service provider system comprising at least one processor and memory storing computer-executable instructions, wherein the distribution service provider system is in communication with a content provider system and consumer premise equipment (CPE) for the transmission of content from the content provider system to the CPE;
the distribution service provider system configured to:
receive audio and/or video content (A/V content) provided by the content provider system, wherein the A/V content includes a digital rights management (DRM) application;
apply a conditional access system (CAS) application to the A/V content, wherein the CAS application is independent of the DRM application;
transmit the A/V content including the CAS application and the independent DRM application to the CPE for presentation;
perform CAS authorization with the CPE to authorize the A/V content according to the CAS application independent of the DRM application, wherein additional DRM authentication is to be performed by the CPE according to the DRM application.

2. The system of claim 1, wherein the A/V content received from the content provider system comprises a CAS application, and wherein, upon receipt of the A/V content from the content provider system, the distribution service provider system is further configured to:
perform CAS authorization with the content provider system to authorize the A/V content use by the distribution service provider system according to the CAS application provided with the A/V content as received from the content provider system; and
remove the CAS application from the A/V content.

3. The system of claim 2, wherein the CAS application provided with the A/V content as received from the content provider system comprises a content provider CAS application and wherein the CAS application applied to the A/V content by the distribution service provider system comprises a service provider CAS application.

4. The system of claim 3, wherein the content provider CAS application and the service provider CAS application differ, and wherein the CAS authorization performed with the CPE is performed according to the service provider CAS application.

5. The system of claim 1, wherein, prior to applying the CAS application to the A/V content, the distribution service provider system is further configured to:
   remove the DRM application from the A/V content;
   process the A/V content after removal of the DRM application; and
   reapply the DRM application to the A/V content.

6. The system of claim 5, wherein processing the A/V content comprises at least one of adding to or manipulating the A/V content.

7. The system of claim 5, wherein the distribution service provider system further comprises a trusted domain in accordance with the DRM application, and wherein the removal of the DRM application, the processing of the A/V content, and the reapplication of the DRM application are performed within the trusted domain.

8. The system of claim 5, wherein the distribution service provider system is further configured to authorize with the content provider system or a third-party DRM system rights of the distribution service provider system to remove the DRM application from the A/V content.

9. The system of claim 8, wherein the distribution service provider system is configured to authorize with the content provider system or the third-party DRM system the rights of the distribution service provider system to remove the DRM application from the A/V content: (a) for each A/V content received or a portion thereof; or (b) independent of individual A/V content received.

10. The system of claim 1, wherein the DRM application comprises a first DRM application, and wherein, prior to applying the CAS application to the A/V content, the distribution service provider system is further configured to:
    remove the first DRM application from the A/V content;
    process the A/V content after removal of the DRM application; and
    apply a second DRM application different from the first DRM application to the A/V content.

11. The system of claim 1, wherein the DRM application is included or associated with the A/V content by the content provider.

12. The system of claim 1, wherein the DRM application is included or associated with the A/V content by a third-party DRM system.

13. The system of claim 1, wherein the distribution service provider system is associated with one of: (a) a cable provider; (b) a multiple systems operator; (c) a satellite provider; (d) an IP content provider; or (e) a digital media host.

14. The system of claim 1, wherein the distribution service provider system is configured to transmit the A/V content to the CPE by one of: (a) linear broadcast; or (b) unicast.

15. The system of claim 1, wherein the A/V content includes the DRM application as at least one of: (a) the DRM application embedded at the beginning of a stream transmitting the A/V content; (b) the DRM application embedded at one or more locations in a stream transmitting the A/V content; or (c) a pointer to the DRM application included in the stream transmitting the A/V content, wherein the DRM application is separately retrievable over a network or from memory.

16. The system of claim 1, wherein the A/V content comprises at least one of: (a) a video on-demand asset; (b) audio content; (c) video content; (d) graphic content; (e) text-based content; non-text-based content; or (f) software.

17. A method for providing content having digital rights management applications separable from other authorization applications, comprising:
    receiving audio and/or video content (A/V content) from a content provider system, wherein the A/V content includes a digital rights management (DRM) application;
    applying a conditional access system (CAS) application to the A/V content, wherein the CAS application is independent of the DRM application;
    transmitting the A/V content including the CAS application and the independent DRM application to a customer premise equipment (CPE) for presentation;
    performing CAS authorization with the CPE to authorize the A/V content according to the CAS application independent of the DRM application, wherein additional DRM authentication is to be performed by the CPE according to the DRM application.

18. The method of claim 17, wherein the A/V content received from the content provider system comprises a CAS application, and further comprising:
    performing CAS authorization with the content provider system to authorize the A/V content use according to the CAS application provided with the A/V content as received from the content provider system; and
    removing the CAS application from the A/V content.

19. The method of claim 18, wherein the CAS application provided with the A/V content as received from the content provider system comprises a content provider CAS application, wherein applying the CAS application to the A/V content comprises applying a service provider CAS application that differs from the content provider CAS application, and wherein performing the CAS authorization with the CPE is performed according to the service provider CAS application.

20. The method of claim 17, further comprising, prior to applying the CAS application to the A/V content:
    removing the DRM application from the A/V content;
    processing the A/V content after removal of the DRM application; and
    reapplying the DRM application to the A/V content.

21. The method of claim 20, wherein removing the DRM application, processing the A/V content, and reapplying the DRM application are performed within a trusted domain in accordance with the DRM application.

22. The method of claim 21, further comprising authorizing with the content provider system or a third-party DRM system rights to remove the DRM application from the A/V content.

23. The method of claim 17, wherein the DRM application comprises a first DRM application, and further comprising, prior to applying the CAS application to the A/V content:
    removing the first DRM application from the A/V content;
    processing the A/V content after removal of the DRM application; and
    applying a second DRM application different from the first DRM application to the A/V content.

24. A system for receiving and utilizing content, comprising:
    a consumer premise equipment (CPE) comprising at least one processor and memory storing computer-executable instructions providing a conditional access system (CAS) module and a digital rights management (DRM) module, the CPE in communication with a distribution service provider system and operable to receive audio and/or video content (A/V content), wherein the A/V content includes a DRM application and a CAS application independent of the DRM application;

the CAS module configured to perform, upon receipt of the A/V content, CAS authorization with the distribution service provider system according to the CAS application; and the DRM module configured to perform DRM authorization with a DRM system according to the DRM application;

wherein the DRM authorization is performed independent of the CAS authorization.

25. The system of claim 24, wherein the DRM system is associated with one of: (a) the distribution service provider; (b) a content provider; or (c) a third-party DRM system.

26. The system of claim 24, wherein the CAS module of the CPE is further configured to remove the CAS application from the A/V content to subsequently allow at least one of: (a) manipulation of the A/V content; (b) storage of the A/V content; or (c) presentation of the A/V content.

27. The system of claim 26, wherein the DRM application comprises a first DRM application, and wherein the DRM module of the CPE is further configured to remove the first DRM application from the A/V content subsequent to removing the CAS application from the A/V content.

28. The system of claim 27, wherein the CPE is further configured to manipulate the A/V content subsequent to removing the first DRM application from the A/V content.

29. The system of claim 27, wherein the DRM application of the CPE is further configured to apply a second DRM application to the A/V content subsequent to removing the CAS application from the A/V content.

30. The system of claim 29, wherein the second DRM application differs from the first DRM application.

31. The system of claim 29, wherein the second DRM application is applied to the A/V content according to at least one of: (a) the second DRM application embedded at the beginning of a stream transmitting the A/V content; (b) the second DRM application embedded at one or more locations in a stream transmitting the A/V content; or (c) a pointer to the second DRM application included in the stream transmitting the A/V content, wherein the second DRM application is separately retrievable over a network or from memory.

32. The system of claim 26, wherein the first DRM application is applied to the A/V content according to at least one of: (a) the first DRM application embedded at the beginning of a stream transmitting the A/V content; (b) the first DRM application embedded at one or more locations in a stream transmitting the A/V content; or (c) a pointer to the first DRM application included in the stream transmitting the A/V content, wherein the first DRM application is separately retrievable over a network or from memory.

33. The system of claim 24, wherein the CPE further comprises a trusted domain in accordance with the DRM application, and wherein the removal of the DRM application, the processing of the A/V content, and the reapplication of the DRM application are performed within the trusted domain.

34. The system of claim 24, wherein the CPE is further configured to transmit the A/V content with the DRM application to a secondary consumer device for DRM authorization and at least one of: (a) manipulation of the A/V content; (b) storage of the A/V content; or (c) presentation of the A/V content.

35. The system of claim 34, wherein the DRM application comprises a first DRM application, and, wherein, prior to transmitting the A/V content to the secondary consumer device, the DRM module is further configured to:

remove the first DRM application from the A/V content subsequent to removing the CAS application from the A/V content; and applying a second DRM application to the A/V content subsequent to removing the CAS application from the A/V content, wherein DRM authorization performed by the secondary consumer device is performed according to the second DRM application.

\* \* \* \* \*